Aug. 22, 1939.   W. TRIBLE ET AL   2,170,510
AUTOMATIC POSITION STOP MECHANISM FOR MACHINE TOOLS
Filed Jan. 31, 1938   2 Sheets-Sheet 2

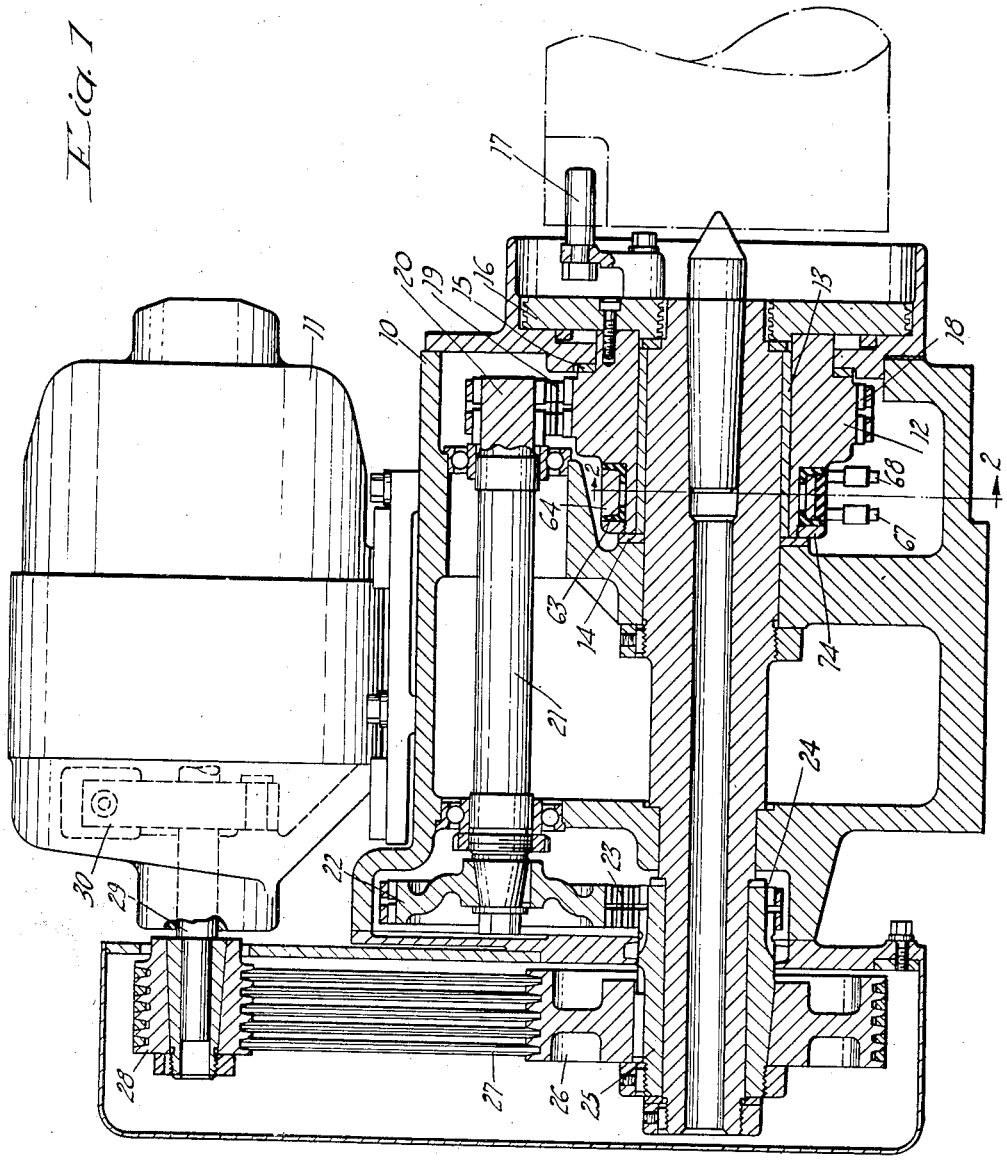

INVENTOR.
WINTHROP TRIBLE
GERHARD F. HECKMAN
BY
Parsons
ATTORNEY.

Patented Aug. 22, 1939

2,170,510

UNITED STATES PATENT OFFICE 2,170,510

AUTOMATIC POSITION STOP MECHANISM FOR MACHINE TOOLS

Winthrop Trible and Gerhard F. Heckman, Cincinnati, Ohio, assignors to Cincinnati Grinders Incorporated, Cincinnati, Ohio, a corporation of Ohio Application January 31, 1938, Serial No. 187,802

13 Claims. (Cl. 188—172)

This invention relates to machine tools and more particularly to improved control mechanism for a motor operated headstock thereof.

Many machine tools have an individual headstock motor whereby starting and stopping of work rotation is obtained by starting and stopping the motor. With such constructions, it is impossible to foretell in what angular position the driving pin will stop.

It is often desired, however, that the work driver be stopped with the driving pin in a predetermined angular position to facilitate loading of the work.

This invention has for an object the provision of an improved control circuit for a headstock motor which is selective in operation, whereby after the current has been disconnected from the motor, the spindle may be stopped in any predetermined angular position; or immediately decelerated; or permitted to decelerate naturally.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 1 is a section through a conventional motor driven headstock of a machine tool showing the application of this invention thereto.

Figure 3:
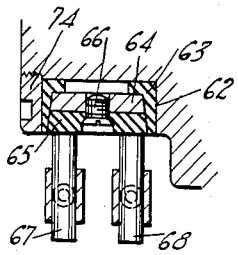
Figure 3 is a detail section on the line 3—3 of Figure 2.

In Figure 1 of the drawings, the reference numeral 10 indicates the frame of a headstock of a machine tool upon the top of which is mounted an electrical motor 11 for actuation of a work driver 12 supported for rotation within the frame. The work driver is journaled on a bearing 13, and held against axial movement by thrust washers 14 and 15. The work driver carries a face plate 16 upon which is mounted a work driving pin 17. The driving pin is adapted to engage a suitable part carried by the work piece for rotating the same, such as an integral shoulder or a conventional detachable driving dog.

The work driver is operatively connected to the motor for rotation thereby through the following mechanism. The work driver 12 is provided with sprockets 18, which mesh with a driving chain 19, that also passes around a sprocket pinion 20 integral with shaft 21, the shaft being antifrictionally journaled in the frame 10 in parallel relation to the axis of the work driver. The shaft 21 has a sprocket wheel 22 driving through chain 23 the sprocket 24 formed on the rotatable hub 25 of a large drive pulley 26. The drive pulley has a series of grooves cut in its periphery by which the same is operatively connected through multiple belts 27 to a drive pulley 28 keyed to the end of motor shaft 29. It will now be apparent that upon rotation of the motor shaft 29, the work driver will be rotated, and at a reduced rate of speed due to the reduction ratio of the operative connections. It will be apparent that after the current is disconnected from the motor, the parts will continue to rotate due to momentum for an appreciable length of time.

Since this time is often too long, it is conventional practice to provide some form of brake to bring the parts to rest in a shorter period of time. This invention deals with a control mechanism for a braking means, whereby the spindle may be stopped in a predetermined angular position, so as to facilitate work loading operations. This control circuit, however, has selective means, whereby the brake may be applied immediately to stop the spindle; or the circuit may be so conditioned that the braking means is entirely ineffective.

Figure 4:
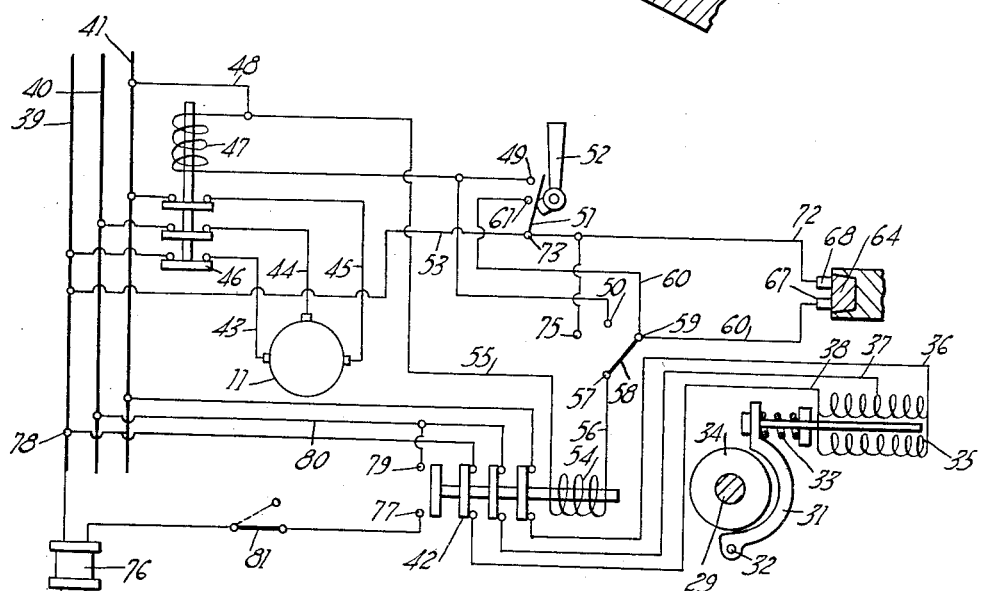
Figure 4 is a diagram of the electrical control circuit.

In the drawings, a conventional form of braking means is illustrated as being mounted within the motor housing, and is indicated generally by the reference numeral 30. Referring to Figure 4, the braking means comprises specifically a shoe 31, which is pivotally supported at 32, and is continuously urged by a spring 33 into contact with a drum 34 carried by the motor shaft 29. Therefore, normally the brake would be in engagement with the drum, and in order for the spindle to rotate, means must be provided for continuously holding the shoe out of contact with the drum during rotation of the spindle. This means is illustrated as an electrical solenoid 35 which is connected by conductors 36, 37 and 38 to the three phase power mains 39, 40 and 41 through a control switch indicated generally by the reference numeral 42.

The motor 11 is shown as connected by conductors 43, 44 and 45 to the power mains 39, 40 and 41 respectively, through a starting switch indicated generally by the reference numeral 46. The starting coil 47 for the switch has one end connected through conductor 48 to the power main 41, and the other end, to switch terminals 49 and 50. The terminal 49 is connectible by the switch member 51, which is operable by the conventionally illustrated switch lever 52, to conductor 53 which terminates in the power main 39. Thus, by closing the switch 51, the starting coil 47 will be energized to close the circuit to the motor and start rotation thereof.

As previously stated, it is necessary that the brake 31 be released in order to permit free rotation of the motor, and therefore a switch operating coil 54 is provided for actuation of switch 52, and connected for simultaneous operation with coil 47. One end of coil 54 is connected by a conductor 55 to the power main 41, and the other end is connected through a conductor 56 to a terminal 57 of a selector switch 58. When the switch 58 is in the position shown in Figure 4, it connects the terminal 57 to a terminal 59 of an electrical conductor 60. The other terminal 61 of this conductor is simultaneously connected by the switch member 51 to conductor 53. It will now be apparent that when the selector switch is in the position shown, and the pilot switch 51 is closed, that the motor will be started, and the brake will be released.

When the pilot switch is opened, the two coils 47 and 54 will normally become de-energized, whereby the switches 46 and 42 will open and break the circuits to the motor and the brake respectively. But the selector switch 58 is shown in a position to cause an automatic stop in a predetermined angular position of the work driver, and to this end the following mechanism is provided. An auxiliary parallel circuit is provided which will function to hold the brake in a released position after the circuit to the motor has been interrupted, whereby the motor will continue due to momentum. After a predetermined time and when the work driver is in a desired angular position, the brake will be automatically applied.

Figure 2:
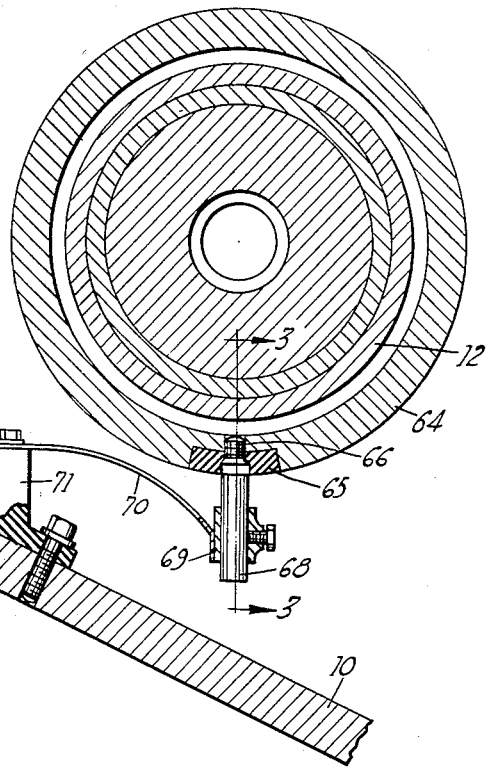
Figure 2 is an enlarged section on the line 2—2 of Figure 1.

To this end the work driver is provided with an annular groove 62 which is lined with insulating material 63 and within this groove is mounted a ring of conducting material 64. As shown in Figure 2, the ring 64 has a non-conducting insert 65 which is held in position by a screw 66. A pair of brushes 67 and 68 are held in contact with the periphery of the ring 64 by mounting them in spring supported brush holders 69. The flat springs 70, which support the brush holders, are attached to a block of insulating material 71 and the current is conducted through these springs to electrical conductors 72 and 60. It will now be apparent that when the brushes are in contact with the ring 64 that the circuit is completed from the conductor 60 to the conductor 72, and this latter conductor is permanently connected to the terminal 73 of switch 51.

This forms a parallel connection from coil 54 to the power main 39, independent of switch 51, whereby when the switch is opened to stop the motor, the coil 54 will remain energized, thereby holding the brake in a released position. After the headstock has rotated a sufficient amount to bring the non-conducting insert 65 under the brushes, the circuit will be broken and the brake applied. Since the parts have decelerated by this time, the brake will be able to stop the parts within the desired number of degrees of revolution, so that the work driving pin will be stopped in substantially the same position each time.

Means have been provided whereby the stopping position of the pin may be changed and this is accomplished by making one side of the groove 62 in the form of a threaded ring 74 which may be loosened so that the ring 64 may be turned to position the insulating block 64 in a different angular position relative to the headstock.

The selector switch 58 has two other positions, in one of which the terminal 57 is connected to the switch point 50 whereby the two coils 47 and 54 are connected in parallel for joint control by the switch 51 whereby when the current is disconnected from the motor, the brake will be immediately applied. In the third position, the terminal 57 is connected to switch point 75 in which position the coil 54 is continuously connected to the power mains 39 and 41, and the brake is held in a released position regardless of whether the motor is running or not.

An additional solenoid 76 is provided for energization by the switch 42, when the same opens to apply the brake. One end of the solenoid is connected to a switch point 77, and the other end to power main 39 at 78. When the switch 42 opens, it interconnects point 77 to terminal 79 of conductor 80 leading to the power main 40. The solenoid 76 may be utilized for actuating an auxiliary device after the headstock has come to rest. It may be rendered inoperative by opening switch 81.

There has thus been provided an improved control circuit for an electric motor actuated work driver whereby a delayed stop of the work driver in some predetermined angular position may be effected to facilitate work loading; or alternatively, the brake may be immediately applied when the electric current is cut off from the motor; or the brake may be permanently held in a released position. In addition, an auxiliary device is provided for selective actuation simultaneously with the application of the brake.

What is claimed is:

1. In a machine of the character described, the combination of a motor, a rotatable part, speed reducing motion transmitting means coupling the motor for rotation of the part at a reduced rate as respects the motor, an electrical control circuit for the motor including a starting switch, a pilot control switch for the starter, a brake for the motor, means operable by the pilot control switch for normally causing application of the brake when the starter switch is opened, a selectively coupleable auxiliary control circuit and means carried by the rotatable part reacting on said control circuit for delaying application of said brake.

2. In a machine of the character described, the combination with a rotatable part, and a motor for actuating said part, of an electrical control circuit having means for starting and stopping said motor, a brake for said motor, and means in said electrical control circuit and controlled by said rotatable part for independently determining application of said brake after the current has been disconnected from said motor.

3. In a machine of the character described, the combination with a movable part, of an electric motor for moving said part, a start and stop switch for said motor, friction means applicable for stopping said motor when said switch is moved to a stop position, and means controlled by said movable part for determining the moment of application of said friction means subsequent to the movement of said switch to a stop position.

4. In a machine tool of the character described, the combination of a rotatable part, an electrically operated switch for determining power rotation of the part, a brake applicable for stopping said part, electrically energizable means for holding said brake in a released position, a control circuit for said switch and said last named means including a pilot switch for simultaneously connecting current thereto, and means carried by said rotatable part for maintaining a circuit through said electrically energized means after the said switches are opened.

5. In a machine tool of the character described, the combination with a rotatable part and an electrical motor operatively connected for rotation of said part, of means for stopping said part in a predetermined angular position after the current to said motor has been disconnected including a brake, an electrical solenoid for holding said brake in a released position, resiliently operable means for applying said brake when said solenoid is de-energized, an electrical control circuit including a switch for said motor and a switch for said solenoid, operating coils for each of said switches, a pilot switch for energizing said coils for simultaneously starting the motor and releasing the brake, an independent parallel circuit for maintaining said brake solenoid energized after the pilot and motor switches are opened, and means carried by the rotatable part for breaking said parallel circuit when said rotatable part is in a predetermined angular position to effect application of the brake and immediate stoppage of the part.

6. In a machine tool of the character described, the combination with a rotatable part and an electrical motor operatively connected for rotation of said part, of means for stopping said part in a predetermined angular position including a brake, an electrical solenoid for holding said brake in a released position, resiliently operable means for applying said brake when said solenoid is de-energized, an electrical control circuit including a switch for said motor and a switch for said solenoid, operating coils for each of said switches, a pilot switch for simultaneously energizing said coils, an independent parallel circuit for maintaining said solenoid energized after the pilot switch opens, means carried by the rotatable part for breaking said parallel circuit when said rotatable part is in a predetermined angular position, and a selector switch for rendering said parallel circuit ineffective whereby the brake will be immediately applied when the motor control switch is opened.

7. In a machine tool of the character described, the combination with a rotatable part and an electrical motor operatively connected for rotation of said part, of means for stopping said part in a predetermined angular position including a brake, an electrical solenoid for holding said brake in a released position, resiliently operable means for applying said brake, an electrical control circuit including a switch for said motor and a switch for said solenoid, operating coils for each of said switches, a pilot switch for energizing said coils, an independent parallel circuit for maintaining said solenoid energized after the pilot switch is opened, means carried by the rotatable part for breaking said parallel circuit when said rotatable part is in a predetermined angular position to cause application of the brake and immediate stoppage of the part, and a selector switch having a first position for maintaining said parallel circuit effective; a second position for rendering said parallel circuit ineffective by connecting said switch coils in parallel for simultaneous operation; and a third position for maintaining the solenoid control switch coil continuously energized to prevent application of the brake when the motor starter switch is opened.

8. In a machine tool of the character described, the combination with a rotatable part and a motor connected for actuation of said part, a motor control circuit, of a brake applicable for stopping rotation of said part, electrically operable means for holding said brake in a released position, an independent control circuit for said electrical means terminating in a pair of brushes, a conductor ring carried by said rotatable part for completing the circuit from one brush to the other, said ring having a non-conducting portion of relatively small arcuate extent for breaking said circuit when the rotatable part is in a predetermined angular position for stopping said part in said position.

9. In a machine tool of the character described, the combination with a rotatable part and a motor connected for actuation of said part, a motor control circuit, of a brake applicable for stopping rotation of said part, electrically operable means for holding said brake in a released position, an independent control circuit for said electrical means terminating in a pair of brushes, a conductor ring carried by said rotatable part for completing the circuit from one brush to the other, said ring having a non-conducting portion of relatively small arcuate extent for breaking said circuit when the rotatable part is in a predetermined angular position for stopping said part in said position, and means mounting said ring for rotative adjustment with respect to said part to vary the angular position in which said part will be stopped.

10. In a machine tool of the character described, the combination with a power driven rotatable part, a motor for driving said part, electrically controlled braking means for stopping rotation of the part, a first potentially available control circuit for effecting simultaneous control of said motor and said brake, an auxiliary control circuit individual to the brake, and selector means for determining the effective inclusion or exclusion of the supplemental circuit as respects the first-mentioned control circuit whereby the operative effect of the brake may be determined simultaneously with or exclusive of the energization of said main control circuit.

11. In a machine tool of the character described including a rotatable part, a motor for effecting rotation of the part, and a brake operative to stop rotation of the part, control means including a first motor controlling circuit, two independent brake control circuits, switch means for determining the operative conditioning of the motor control circuit, and selector means for determining the completion of one of said brake control circuits alternatively through or exclusive of said motor control circuit.

12. In a machine tool of the character described, the combination with a power driven rotatable part, a motor for driving said part and a brake applicable for stopping of said part, of electrically operable means for holding said brake in released position, and electrical control circuits including a first circuit for determining energization and de-energization of the motor, a second circuit coupleable with the motor control circuit for effecting application of the brake simultaneously with stopping of the motor, an additional circuit for determining application of the brake independent of the motor control, and selector means for determining the respective effective couplings of the brake control circuits.

13. In a machine tool of the character described, the combination with a power driven rotatable part, a motor for driving said part and a brake applicable for stopping of said part, of electrically operable means for holding said brake in released position, and electrical control circuits including a first circuit for determining energization and de-energization of the motor, a second circuit coupleable with the motor control circuit for effecting application of the brake simultaneously with stopping of the motor, an additional circuit for determining application of the brake independent of the motor control, and selector means for determining the respective effective couplings of the brake control circuits, said last-mentioned brake control circuit including an element actuable by movement of the part whereby application of the brake may be effected in accordance with predetermined positioning of the part.

WINTHROP TRIBLE.
GERHARD F. HECKMAN.